United States Patent [19]

Shanbhag et al.

[11] 3,930,034

[45] Dec. 30, 1975

[54] SIMULATED STRAWBERRY SLICES AND METHOD OF PREPARING THE SAME

[75] Inventors: Sudhakar P. Shanbhag, Tarrytown; Alina S. Szczesniak, Mount Vernon, both of N.Y.

[73] Assignee: General Foods Corporation, White Plains, N.Y.

[22] Filed: Oct. 29, 1973

[21] Appl. No.: 410,582

[52] U.S. Cl. ............... 426/104; 426/250; 426/270; 426/639; 426/464; 426/803
[51] Int. Cl.² ............................................. A23G 1/00
[58] Field of Search ........... 426/250, 252, 289, 293, 426/295, 302, 310, 378, 379, 429, 426, 104, 262, 270, 281, 615, 637, 639, 640, 455, 456, 464, 803

[56] References Cited
UNITED STATES PATENTS

| | | | |
|---|---|---|---|
| 2,834,681 | 5/1958 | Kreager | 426/378 |
| 2,949,367 | 8/1960 | Goldmeier | 426/250 |
| 2,976,159 | 3/1961 | Swisher | 426/290 |

*Primary Examiner*—Norman Yudkoff
*Assistant Examiner*—Martin G. Mullen
*Attorney, Agent, or Firm*—Daniel J. Donovan; Bruno P. Struzzi; Doris M. Bennett

[57] ABSTRACT

Simulated strawberry slices suitable for use in food systems are made by infusing fresh apple pieces with an infusion solution consisting of soluble, edible water binders, a food acid and coloring, the infusion solution serving both to adjust the water activity of the strawberry slices to be compatible with the particular food system into which they are incorporated so as to preserve the desirable and inherent qualities of the latter, and to act as a transport medium for the color during the infusion process which produces a simulated strawberry appearance when the apple is sliced.

12 Claims, No Drawings

SIMULATED STRAWBERRY SLICES AND METHOD OF PREPARING THE SAME

BACKGROUND OF THE INVENTION

This invention relates to the method of preparing a novel simulated fruit. In particular, the invention pertains to the treatment of edible plant tissue with an infusion solution whereby said solution penetrates in such a way as to cause the plant tissue to assume the appearance, taste and texture of a totally different plant tissue. At the same time, the water activity of the plant tissue may be equated with the water activity of the foodstuff into which the plant tissue may be incorporated.

The practice of infusing water stabilizing solutions having the same water activity into all phases of a multi-phase food product in order to equate the vapor pressures of each phase for the purposes of preventing water migration and consequent spoilage is well-known in the art. Exemplary of such a practice is taught in U.S. Pat. NO. 3,634,104 issued Jan. 11, 1972 which concerns infusing both phases of a meat and/or vegetable and gravy type product with a stabilizing solution having a water activity of about 0.6 to about 0.9. Similarly, U.S. Pat. No. 3,694,233 issued Sept. 26, 1972 teaches stabilization of combined foods and liquids wherein the solid and liquid phases of a food product are infused with stabilizing solutes so that each phase acquires a water activity which is approximately equivalent to the other. An additional patent of interest is U.S. Pat. No. 3,595,681 issued July 27, 1971 which teaches similar methods of deriving shelf-stable products.

The practice of infusing a colored water stabilizing solution, however, into a specific foodstuff whereat the color infuses differentially in order to impart to the foodstuff the appearance of a totally different foodstuff while at the same time providing a means of rendering the foodstuff shelf stable and compatible with other foods with which it may be admixed is believed to be novel and is the subject of this application.

Heretofore, it has commonly been the practice to produce fruit-containing food products by incorporating in the same the desired fruit in either the dried or wet form depending upon the degree of moisture in the system.

Maintaining the desired flavor and texture of fruit after undergoing a drying and subsequent rehydrating procedure has proved to be a significant technological problem. Generally, in order to achieve a significant technological problem. Generally, in order to achieve a satisfactory degree of stability it has been necessary to dehydrate the fruits to a level whereat they are hard and have a tough fibrous structure. In the past, dehydration followed by reconstitution with the natural juice and/or concentrates was performed which served to substantially replace lost flavor but was ineffective respecting chemical flavor alteration, texture improvement and the like.

Strawberries are a rather unique type of fruit in that their cellular structure and low solids content which allow them to support a large amount of moisture, severely restrict the types of processing to which they may be subjected in comparison to a majority of fruits. For example, where most fruits may be frozen and thereafter thawed with moderate damage, strawberries undergo a severe cellular disorganization whereby they become soft and limp with a poor shape retention as compared to the moderately firm textural qualities of a fresh-picked strawberry. A similar phenomenon is noted with canned or freeze-dried strawberries where there is a textural degradation such that their normal state of turgidity depreciates and they assume a mushy texture. In addition, where freeze-drying is commonly used to improve upon the ability of fruits to reconstitute in a liquid system, freeze-dried strawberries upon rehydration assume a slimey appearance and mouth feel, not to mention the costliness of this procedure.

Although shelf-stable or intermediate moisture fruits having moisture levels sufficient to impart softness have been prepared in the past and have enjoyed appreciable success, even this method has proved detrimental to the strawberry since the desirable textural firmness of this fruit is relinquished, demonstrating an appreciable decrease in firmness, cohesiveness and color.

Ideally, a fruit product which has the appearance, flavor and texture of a desirous fruit but which consists essentially of another far more economical and available type of fruit capable of maintaining the desirable flavor and textural qualities of the former in numerous types of food system would introduce an entirely new scope to the fruit-containing foodstuffs market. This invention affords a method of effecting the same by describing an intermediate moisture simulated sliced strawberry of apple derivation.

SUMMARY OF THE INVENTION

Although it is believed that most types of edible plant tissue would serve the purpose of this invention, we prefer to employ parenchymal, that is plant storage tissue, which includes the potato or the apple which is the preferred embodiment of this invention. Fruits such as the apple are distinct from vegetable in that they are the edible ovarian reproductive body of a seed. Hence, reference will henceforth be made specifically to the use of the apple but this invention is intended to include other parenchymal plant tissue which are seen to those skilled in the art to be appropriate for use and inclusion in this invention.

It has been found that it is possible to treat a fruit with a specific infusion solution whereby said fruit is made to assume the appearance, taste and textural characteristics of a totally different fruit. More specifically, when fresh apple slices are treated with an infusion solution of soluble edible water binders, a food acid, suitable flavor and strawberry color, the apple slices acquire the semblance and gustatorial characteristics of fresh strawberries in addition to being shelf-stable.

The preparation of intermediate moisture food systems involves infusing the food system with an aqueous solution containing water binders i.e., solutes such as edible polyhydric alcohols capable of complexing the moisture of the food system to the extent that it is bacteriologically stable and incapable of imparting an equilibrium vapor pressure which is sufficiently different in magnitude than that of a product into which it may be incorporated to cause a net transfer of moisture from one to the other. The gist of the present invention is infusing a particular food system with a colored infusion solution such that the food system is not only shelf-stable and capable of being in water vapor equilibrium with foods with which it is admixed but assumes the appearance of a totally different food system by reason of a differential infusion of color.

The unusual coloring effect derived from the infusion of the food color in the water-binding solution was completely unexpected and could not have been predicted from the composition of the infusion solution nor the structural characteristics of the apple. However, it is postulated that the chemical nature and molecular weight of the color solution in relation to the structural makeup of the apple accounts for this differential coloring effect. The invention is predicated upon the discovery of this coloring phenomenon and the fact that the simultaneous infusion of edible water binders, a food acid, strawberry coloring and strawberry flavor renders a product which has the desirable sensory characteristics of a strawberry. In addition, by careful regulation of the water binder concentration in the infusion solution, the synthetic strawberries can be made to be suited for incorporation into dry, semi-moist, and moist systems thereby allowing such systems to remain dry or moist while at the same time maintaining their own intrinsic strawberry-like flavor, texture, mouth-feel, appearance and "keeps well" properties. In all cases, equalization of vapor pressures of the fruit and food systems into which the fruit is to be incorporated affords a product which remains stable during storage for by so equating the vapor pressures of the two components, there is no potential or influencing driving force to urge a net transfer of moisture.

Accordingly, the present invention is intended to supply an efficient and economical method of providing strawberry-like fruits for incorporation into food systems.

It is still another object of the invention to provide a foodstuff containing strawberry-like fruit in which there is no excessive dehydration or hydration of the fruit by the dry, semi-moist or moist foodstuff incorporated therewith, thereby allowing the fruit to retain its initial characteristic soft texture and appealing eating quality.

The above and additional objects of the invention are accomplished by treating the fresh apple pieces with an infusion solution containing water binders, a food acid and an effective amount of flavor and coloring, the infusion solution serving both to carry the color into the apple and to equate the vapor pressures of the foodstuff and the fruit incorporated therein thereby imparting microbial stability to the fruit while imparting textural stability to the food product, the food color serving to define the differential colored characteristics of popular varieties of sliced strawberries.

DESCRIPTION OF THE INVENTION

Although the present invention has been summarized in terms of color penetration and equilibrium of vapor pressure, a more detailed explanation of the latter can best be set forth by the use of the term "water activity." Water activity is a term now commonly used in the food processing art, particularly with respect to its effect on maintaining bacteriostasis in intermediate moisture foods i.e., foods having moistures in the range of from about 20 to about 50%. Water activity is the measure of the ratio of the equilibrium vapor pressure of water above a substance, such as a food, to the vapor pressure of pure water, both taken at the same temperature. It is therefore a dimensionless number and to say, for example, that a strawberry at 85 to 90% moisture has a water activity, hereinafter referred to as Aw, of 0.99 at 70°F, in effect amounts to saying that the water equilibrium vapor pressure above the strawberry is but 0.99 the value of that of water vapor pressure above pure liquid water at the same temperature. The present invention therefore contemplates the introduction of a solution containing water binders, a food acid, flavor and coloring into fresh apple slices in order to derive an intermediate moisture fruit having the desirable organoleptic properties of a strawberry. Water binders are those substances capable of binding water by chemical or physical mechanisms such as hydrogen bonding, capillary bonding or the like thereby reducing the water activity of the system. By permitting this infusion solution to penetrate the apple for a specific length of time, shelf-stable apple slices possessing the visual, taste and textural characteristics of a fresh strawberry slice are obtained. Since the essence of this invention is the unique differential coloring effect derived from the infusion of a water-binder solution containing a coloring agent, it is not essential that the food acid and flavoring agent be incorporated into the infusion solution since they can be sprayed onto the apple slices and allowed to equilibrate in order that the flavor penetrates the slice. However, mainly for reasons of convenience, it is preferred that the food acid and flavoring agent be homogenously mixed into the solution and incorporated directly into the infusion solution.

The salient point of this invention, therefore, is the unique differential infusion rate of color to water binders rendering apple slices with strawberry color on the outside and a progressively decreasing color intensity the further the water binders infuse into the apple slice, thus simulating the appearance of popular varieties of strawberries in their sliced form.

The apple cortex is composed mainly of large, thin-walled, loosely arranged parenchyma cells with sparse vascular bundles scattered throughout. The exact relationship between the structural characteristics of the apple cortex, more specifically of the parenchymatous layer and the rate and/or extent of color infusion is not immediately understood. Originally, it was theorized that such color phenomenon was due to a progressively more concentrated cellular structure and the presence of gregarious filaments as the core of the apple was approached thereby proportionately hindering color infusion. However, a piece of apple obtained by cutting a wedgelike portion reaching from the outer extremity of the apple to the core and thereby containing the gamut of cellular components, when placed in the infusion solution, was seen to demonstrate the same penetration rate from the more concentrated core structure to the center of the wedge as the outer, more sparsely structured portion of the apple wedge.

In the standard procedure, the apples are peeled and sliced into eight wedges parallel to the vertical axis of the apple core. Each wedge is then cut in half perpendicular to its axis. The 16 pieces of apple may thereafter be soaked in an anti-browning solution such as sodium bisulfite.

The infusion solution is prepared by combining water, a soluble edible polyhydric alcohol selected from the group consisting of glycerol, propylene glycol, 1,3-butylene glycol, sucrose, dextrose, fructose, sorbitol, or mixtures thereof, the concentration of water binders depending upon the desired water activity. This is boiled and allowed to cool.

The strawberry color is added to the infusion solution either by itself or, alternatively, as a solution containing in addition to strawberry color, strawberry flavor and a food acid. The latter method is preferred both from a manufacturing and consumer standpoint since the simultaneous infusion of the flavor components with the colored water binding solution assures a more thorough penetration into the apple pieces. Of the food acidulants, citric acid is preferred since it is the major acid constituent of the strawberry.

The time during which the solution is allowed to infuse is not a crucial factor in the obtention of the differential coloring effect so long as it is of sufficient duration to allow infusion of water binders to become complete. The viscosity and the soluble solids content of the infusion solution are obvious considerations for those skilled in the art in determining the time required for a specific infusion solution. Numerous infusion procedures may be employed such as soaking the apple pieces in an excess of the solution, utilization of pressure infusion, infusion after subjecting the apples to reduced pressures, immersion of the apple pieces in solutions of elevated temperatures or similar apparent method modifications. Whichever method is chosen, the outside of each apple piece should indicate that the entire piece has been exposed to the infusion solution. In addition, during the infusion process, where applicable, it is preferred that the vessel containing the apple pieces and infusion solution be covered to prevent flavor and water loss through evaporation. Similarly, after infusion and draining, the apple pieces are preferably maintained in a closed container at room temperature. However, if the apple pieces are to be dusted after infusion with a non-hygroscopic dusting agent, the apple pieces may be spread out in a thin layer and allowed to equilibrate and dry in the open air, uncovered, at room temperature or slightly above, e.g., 100° – 110°F.

Different combinations of edible, soluble solids have been shown to possess the desired infusion rates and water stabilizing properties for the purposes of this invention. Of the polyhydric alcohols previously mentioned, the combination of glycerol and sucrose at respective weight ratios of about 3:1 to about 1:1 in aqueous solution is the preferred water binder solution of this invention, glycerol being the preferred solute because it not only effectively stabilizes the moisture of the fruit but imparts added simulated moisture together with its intrinsic sweet flavor.

Depending upon the degree of moisture in the system into which the simulated strawberries are to be incorporated, the concentration of water binders within the infusion solution and consequently the viscosity, will be increased or decreased accordingly. Therefore, for use in a dry system such as cereal which has a water activity (Aw) of approximately 0.4, the water activity of the simulated strawberry is accordingly adjusted to 0.4. The range of water activity may go as high as about 0.85 the desired moisture content in the 0.3 to 0.85 Aw range being from about 10 to about 52%.

After the infusion process, i.e., after equilibration, the apple pieces may be sprinkled with an edible non-hygroscopic dusting agent such as a protein or carbohydrate for example, a modified starch, or the like which gives the apple pieces the external speckled appearance of a strawberry and prevents adhesion of the strawberry products to each other, a modified tapioca starch such as the commercial "Textaid" being preferred. On cutting these apple pieces into two or three slices, a fruit having the physical and sensory attributes of a strawberry slice is obtained.

This invention finds utility in food systems such as cereals, gelatin desserts, pudding, jams, fruit cocktail, cookies, muffins or wherever incorporation of a strawberry-like fruit having shelf-stable properties is desired. Where the strawberries of this invention are to be utilized in systems having water activities higher than about 0.6, it is desirable to have edible anti-microbial agents such as potassium sorbate incorporated into the infusion solution in the amount sufficient to impart microbial stability to the product following processing. In addition to the above, these simulated strawberries are a very good snack such as a candied treat or the like.

In order that the present invention be more clearly understood, reference will now be made to the following examples pertaining to the preparation of the same.

EXAMPLE I

Six pounds of fresh apples (Granny Smith) were peeled and each individual apple sliced into eight wedges, each wedge subsequently cut into two pieces across the long axis of the wedge.

The apple pieces were soaked in a 3% sodium bisulfite solution for about 3 hours and drained.

The following infusion solution was prepared having a water activity of 0.58:

750.0 g water
750.0 g glycerol
750.0 g cerelose 2401 (commercial dextrose)
3000.0 g sucrose This solution was brought to a boil and cooled to room temperature.

The following ingredients were mixed together and added to the cooled liquid infusion solution together with 1500 g of drained apples:

15.0 g citric acid
0.3 g "Maltol" Mix
12.0 g sugar plated strawberry color
15.0 g sodium metabisulfite
3.0 g strawberry flavor [20% strawberry flavor having been fixed on 80% gum]

The apple pieces were allowed to soak at room temperature for about 18 hours after which they were drained.

The drained apple pieces were dried in a forced air drier at 120°F for about 1 hour, 100°F for 5 hours and equilibrated at room temperature for about 20 hours.

The apple pieces were placed in a candy coater, which is essentially an open drum-type apparatus, and to these slices were added 20 g of powdered modified starch together with 10 g of modified starch flakes. The ingredients were tumbled inside the candy coater, the modified starch thereby coating the apple slices to give the external speckled appearance of a strawberry.

Each apple piece was sliced into three pieces and evaluated for their water activity and moisture content which were respectively 0.50 and 15%. The resulting product was seen to have the visual as well as flavorful and textural characteristics of sliced strawberries.

EXAMPLE II

An infusion solution containing 1,000 g water, 1,000 g propylene glycol, 1,000 g glycerol and 2,000 g sucrose was prepared as in Example I to render a solution having a water activity of about 0.64.

The apple pieces, as cut in Example I, were placed in a stainless steel bowl containing the infusion solution, covered and allowed to infuse for 16 hours at room temperature. Subsequently the apples were dried at room temperature, and allowed to equilibrate for 24 hours.

The apple pieces were then dusted with about 20 g modified starch powder and 10 l g of modified starch flakes. Each apple piece was sliced into three pieces.

The simulated strawberries were mixed with corn flakes in a 1 to 3 weight ratio and placed in capped glass jars.

The cereal product was allowed to equilibrate for 2 weeks and the water activity of the simulated strawberries and cereal and the moisture levels of each were determined.

Both components of the cereal product had a water activity of about 0.52. However, the cereal itself had a moisture content of approximately 6%, while the fruit slices themselves maintained a level of 15.8% moisture.

A sample of the resultant product was stored at ambient temperatures in a sealed jar for about 1½ years. No visible spoilage had occurred.

Consequently, the resulting cereal product was crisp and fresh while it contained soft, moist pieces of fruit which had the appearance, flavor and texture of sliced strawberries.

What is claimed is:

1. A method of preparing a simulated strawberry colored food stuff which comprises peeling and slicing into pieces plant tissue composed mainly of large, thin-walled, loosely arranged parenchyma cells and infusing the plant tissue pieces with an aqueous water binding solution containing an effective amount of strawberry color and an amount of at least one edible polyhydric alcohol selected from the group consisting of glycerol, 1,3 - butylene glycol, propylene glycol, sucrose, dextrose, fructose and sorbitol sufficient to impart a water activity to the plant tissue of from about 0.3 to about 0.85 and a moisture content of about 10 to about 52%, said water binding solution having been infused into the plant tissue pieces for a period of time effective to allow infusion of the strawberry colored solution to become complete thereby imparting strawberry color to the outside of the piece with a progressively decreasing strawberry color intensity the further the solution infuses into said piece and thereafter further slicing said infused piece.

2. The method of claim 1 wherein the plant tissue is fruit.

3. The method of claim 2 wherein the fruit is apple.

4. The method of claim 3 wherein the water binding solution contains glycerol and sucrose in a ratio of from about 1:1 to about 3:1 respectively by weight.

5. The method of claim 1 wherein the water binding solution also contains food acidulant and strawberry flavor.

6. The method of claim 5 wherein the edible acid is citric acid.

7. the method of claim 1 wherein the plant tissue pieces are soaked in an excess of water binding solution ranging from about 2 to about 7 parts of solution by weight of the plant tissue and thereafter drained prior to said further slicing.

8. The method of claim 1 wherein the plant tissue pieces are dusted with an edible non-hygroscopic dusting agent prior to said further slicing.

9. The method of claim 8 wherein said dusting agent is a modified starch.

10. The method of claim 1 wherein the plant tissue is dried subsequent to infusion at temperatures from room temperature to not exceeding about 160°F.

11. A simulated strawberry foodstuff having the visual, flavorful and textural characteristics of a fresh strawberry comprising peeled edible plant tissue slices composed mainly of large, thin-walled, loosely arranged parenchyma cells and having infused therein an aqueous water binding solution containing at least one edible polyhydric alcohol selected from the group consisting of glycerol, 13-butylene glycol, propylene glycol sucrose, dextrose, fructose and sorbitol; strawberry color, strawberry flavor, and a food acid, the water binding solution containing an amount of edible polyhydric alcohol sufficient to impart a water activity to the plant tissue of from about 0.3 to about 0.85 and a moisture content of 10% to 52%, said aqueous water binding solution having been infused into said plant tissue slices for a period of time effective to allow infusion to become complete thereby imparting strawberry color to the outside of the slice and a progressively decreasing strawberry color intensity the further the water binding solution infuses into the plant tissue slices.

12. The foodstuff of claim 11 wherein the plant tissue is an apple piece infused with an aqueous water binding solution containing strawberry color, strawberry flavor, citric acid and from about 1:1 to about 3:1 parts by weight of glycerol to sucrose.

\* \* \* \* \*